Sept. 4, 1956 A. G. KOHLE 2,761,192
RIBBING BLOCKING MACHINE
Filed April 16, 1954 3 Sheets-Sheet 2
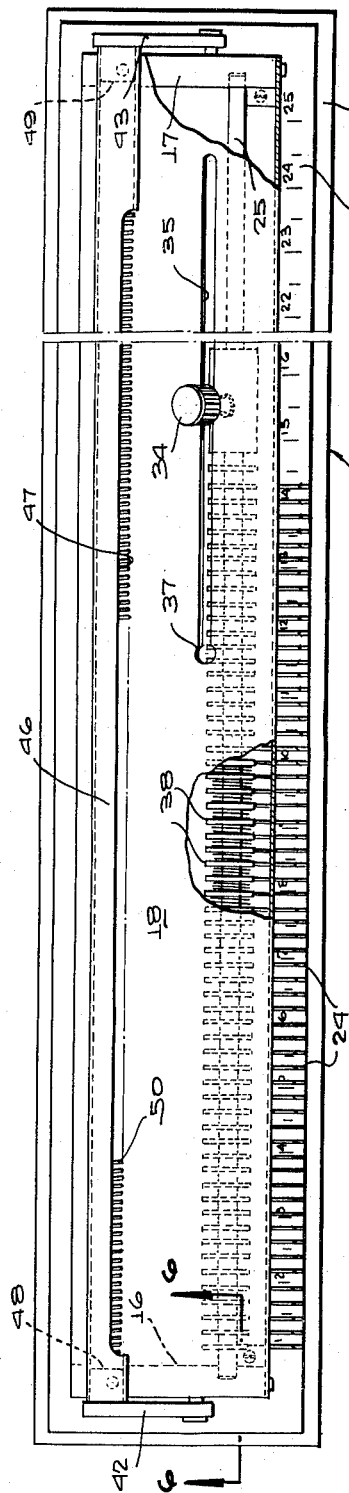
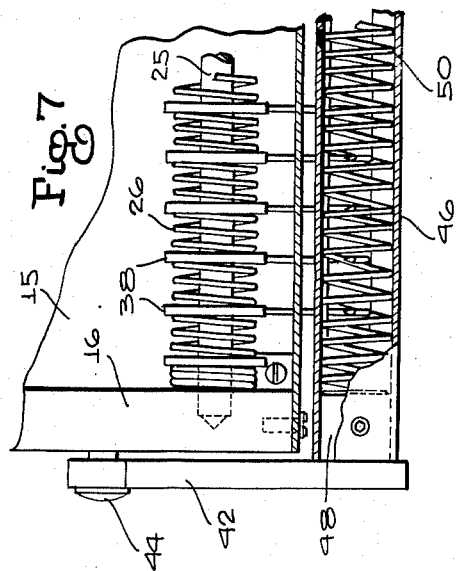
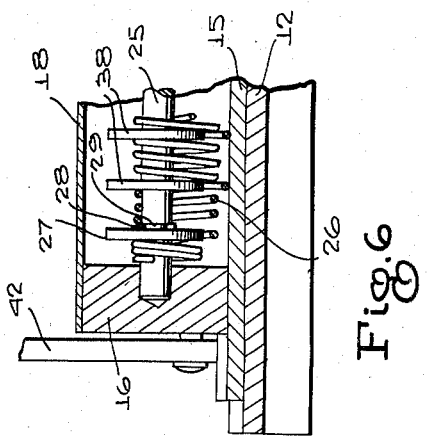
INVENTOR.
ALBERT G. KOHLE
BY
McMorrow, Berman + Davidson
ATTORNEYS Sept. 4, 1956 A. G. KOHLE 2,761,192
RIBBING BLOCKING MACHINE
Filed April 16, 1954 3 Sheets-Sheet 3

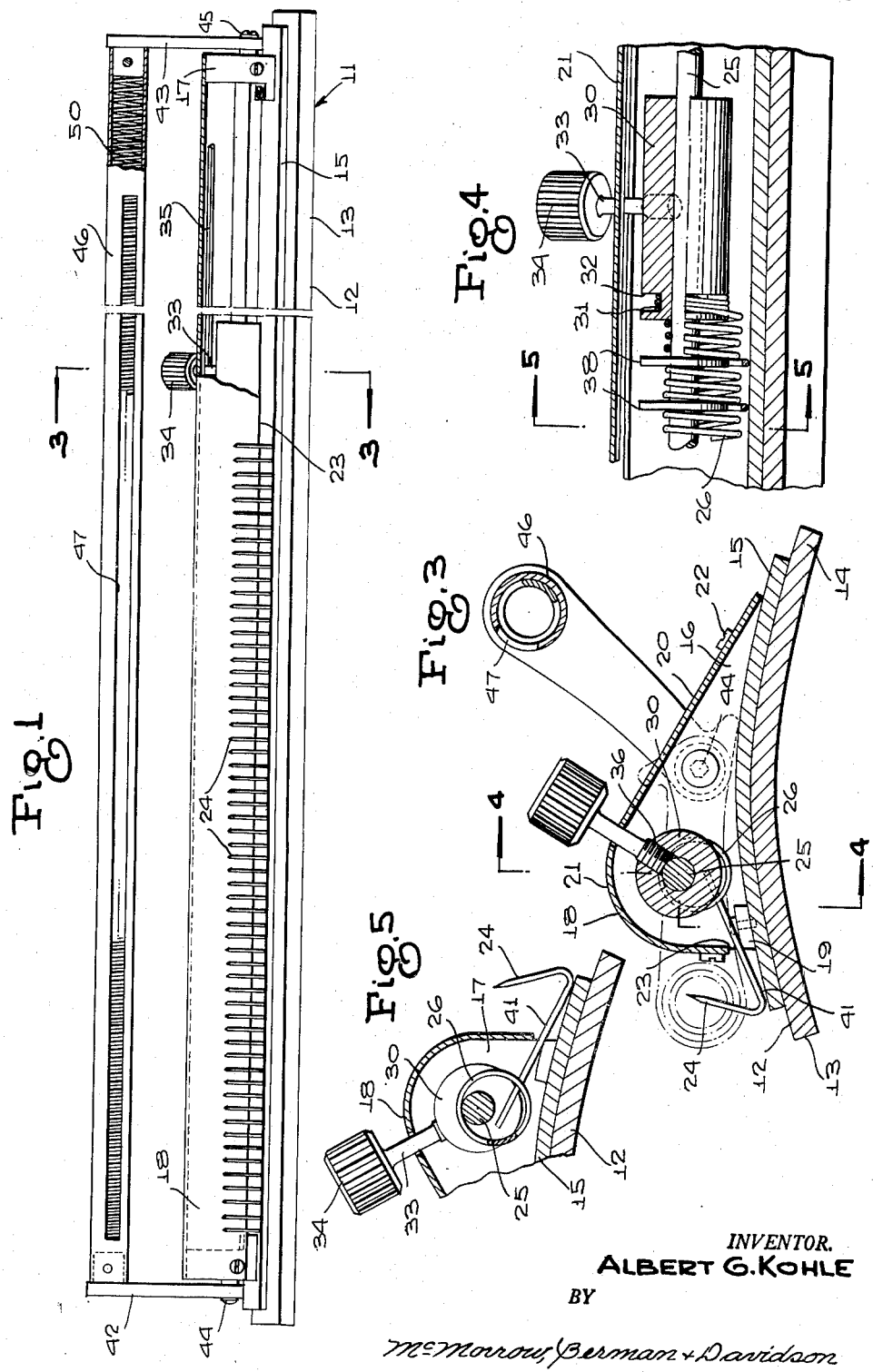

INVENTOR.
ALBERT G. KOHLE
BY
McMorrow, Berman + Davidson
ATTORNEYS

United States Patent Office 2,761,192
Patented Sept. 4, 1956

2,761,192

RIBBING BLOCKING MACHINE

Albert G. Kohle, Santa Clara, Calif.

Application April 16, 1954, Serial No. 423,758

8 Claims. (Cl. 26—18.5)

This invention relates to apparatus for use in conjunction with a steam pressing machine, and more particularly to a device for blocking and shaping ribbed portions of knitted garments in a steam pressing machine.

A main object of the invention is to provide a novel and improved ribbing blocking device for use on a steam pressing machine, said device being very simple in construction, being easy to operate, and providing an improved means of restoring ribbed portions of knitted garments to their original shapes and for restoring the original elasticity of said ribbed portions.

A further object of the invention is to provide an improved blocking device for use in a steam pressing machine for reshaping and reconditioning ribbed portions of knitted garments, said device involving fewer parts than the previously known devices for performing the same function, requiring no modification of the steam pressing machine nor penetration of the surface of the steam pressing machine, being simple to operate, being durable in construction, being light in weight, and being relatively compact in size.

A still further object of the invention is to provide an improved ribbing blocking device for use on a steam pressing machine, said device having a base portion which engages the surface of the steam pressing machine and is retained thereon without actually penetrating the surface of the steam pressing machine, the device being operable by one hand of the operator, being more durable than the previously known devices of this type, providing a more positive locking action on the material being processed, and providing increased speed in operation as compared with the previously known device of the same type.

A still further object of the invention is to provide an improved ribbing blocking device for use on a steam pressing machine which is arranged to provide a measurement of the dimensions of ribbing material before and after the blocking process.

Further objects and advantages will become apparent from the following description and claims, and from the accompanying drawings, wherein:

Figure 1 is a front elevational view, partly in cross section, of an improved ribbing blocking machine constructed in accordance with the present invention;

Figure 2 is a top plan view, partly broken away, of the ribbing blocking machine of Figure 1;

Figure 3 is an enlarged vertical cross sectional view taken on line 3—3 of Figure 1;

Figure 4 is a vertical cross sectional view taken on line 4—4 of Figure 3;

Figure 5 is a vertical cross sectional view taken on line 5—5 of Figure 4;

Figure 6 is a vertical cross sectional detail view taken on line 6—6 of Figure 2;

Figure 7 is an enlarged horizontal cross sectional detail view taken through an end portion of the ribbing blocking machine of Figure 1 with the channel member thereof arranged in a position wherein its spring is in meshing engagement with the spurs of the machine;

Figure 8:
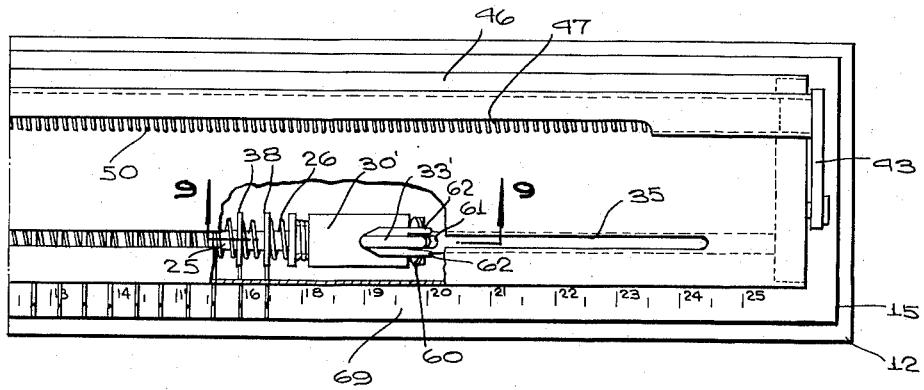
Figure 8 is a fragmentary top view, partly broken away, of a modified form of ribbing blocking machine according to the present invention.

Referring to the drawings, the machine is designated generally at 11. Said machine comprises an elongated, generally rectangular, downwardly concave base 12 of any suitable material, said base being arcuate in transverse cross section, as shown in Figure 3, and having straight parallel longitudinal edges 13 and 14. Secured on the base 12 is the plate member 15, of generally similar shape, as is clearly shown in Figure 3.

The base 12 defines a wide, shallow longitudinal groove thereunder which is open at its opposite ends to provide a means for the escape of steam from below said base when the base is mounted on the buck pad of a steam pressing stand. Furthermore, the longitudinal edges 13 and 14 of said base engage the buck pad and serve to anchor the base to the pad, since the edges 13 and 14 define depending anchoring flanges at the opposite longitudinal edges of the base which indent the buck pad sufficiently to retain the base against movement on said pad.

Secured to the opposite end portions of the plate member 15 are the vertical, upstanding block elements 16 and 17 which are of identical shape and which are generally triangular, as shown in Figure 3. The block elements 16 and 17 have arcuately curved top forward edge portions 18, vertical front edge portions 19, and downwardly and rearwardly inclined sloping rear edge portions 20.

Secured on the block members 16 and 17 is the cover plate 21, of sheet metal or other suitable material, the cover plate being secured to the block members by suitable fasteners, such as screws 22, as shown in Figure 3. As shown in Figure 3, the forward longitudinal edge of the cover member 18, designated at 23 is spaced above the plate member 15 to define a longitudinal slot through which the shank portions of the spur elements 24 extend.

Secured in the forward portions of the respective end blocks 16 and 17 are the respective ends of a longitudinally extending rod member 25 which is mounted in the blocks 16 and 17 so as to extend parallel to the longitudinal edges of the base 12. Designated at 26 is a coil spring surrounding the rod member 25 and therefore extending longitudinally of said rod member.

One end of the spring 26 is fixedly secured to one end portion of the rod member 25 adjacent the block member 16, as by having several turns thereof engaged between a washer 27 and the block 16, said washer being anchored by a U-shaped locking collar 28 engaged in an annular groove 29 formed in the rod 25 at the side of the washer 27 opposite the block member 16, as shown in Figure 6. Slidably mounted on the rod member 25 is a sleeve member 30 to which the other end of spring 26 is secured, as shown in Figure 4, as by winding several turns 31 of the spring 26 in an annular groove 32 formed in the end portion of the sleeve 30.

Threadedly engaged through the wall of the sleeve 30 is a set screw 33 provided with a knob 34, the shank of the set screw 33 extending through a longitudinal slot 35 formed in the cover member 18. Thus, the spring 26 may be held in an expanded condition by moving the sleeve 30 to the right along the slot 35, as viewed in Figure 2, and by then tightening the set screw 33 to lock the sleeve 30 with respect to the rod 25.

The set screw 33 is provided with the slightly enlarged threaded portion 36 which engages in a radial threaded bore in the sleeve 30, the end of the slot 35 being slightly enlarged, as shown at 37 to allow the insertion of the enlarged threaded portion 36 of the set screw 33 therethrough when the set screw is assembled with the sleeve 30.

Slidably mounted on the rod 25 are spaced washer discs 38 which are engaged between spaced turns of the spring 26, whereby the washer discs 38 float on the rod 25 and are slidable thereon in response to expansion or contraction of the spring 26. Any desired number of washer discs 38 may be employed, and any desired number of coils of spring 26 may separate said discs.

Secured to the lower portion of each disc 38 is a forwardly and downwardly projecting shank element 41 formed at its free end with an upwardly projecting pointed spur 24. The rod element 41 extends through the slot defined between the bottom edge 23 of the front wall of cover member 18 and the subjacent plate 15, as shown in Figure 3, and as described above. The forward portions of the rods 41 overlie the forward marginal portion of the plate member 15, and the spurs 24 are in longitudinal alignment. When the spring 26 is in a released condition, as shown in Figures 1 and 2, the rods 41 and spurs 24 are relatively closely spaced. The rods 41 and spurs 24 may be uniformly spread to relatively widely spaced positions by moving the sleeve member 30 to the right, as viewed in Figure 4 and by then tightening the set screw 33, as above explained.

Designated at 42 and 43 are respective arms pivoted at 44 and 45 to the respective block members 16 and 17 rearwardly of the longitudinal axis of the rod 25. Designated at 46 is a longitudinally extending, downwardly facing channel member, which may comprise a section of tubing formed with a longitudinal slot 47 through a substantial portion thereof to define a channel, the member 46 being secured at its opposite ends to the respective arms 42 and 43, as by being fastened on respective studs 48 and 49 provided on said arms, said studs being in axial alignment with each other and being located on an axis parallel to rod 25. Designated at 50 is a floating coil spring which is disposed inside the member 46 and which is exposed through the slot 47. The arms 42 and 43, and the channel member 46 may be rotated counterclockwise from the position thereof shown in Figure 3 in full line view to the dotted line position shown in said figure, wherein the spurs 24 enter the slot 47 and meshingly interengage with the turns of the spring 50. This procedure is employed when the ribbed portion of a knitted garment is to be engaged with the spurs 24, as will be presently described.

The spring 50 is designed to float in order to eliminate the jamming of the spring if the hooks or spurs 24 were to be expanded while the channel member 46 was in its lowered position directly over the spurs. If this happens, the spurs meshingly engage the coiled spring 50, expanding the spring because of its floating action, causing no damage to the spring or spurs.

In operation of the device, the device is first mounted on the buck pad of a steam pressing stand, as previously described. The spring 26 is then expanded by moving the sleeve 30 to the right, as viewed in Figure 4, and by then tightening the set screw 33 as previously described. The spurs 24 are thus positioned in spread apart relation. The ribbed portion of the garment to be reshaped is then engaged on the spread-apart spurs 24. The channel 46 is then rotated from the position thereof shown in Figure 3 in full line view to the dotted view position shown in said figure, to meshingly engage the spurs 24 with the spring 50, the channel member 46 being pressed downwardly, thereby pressing the ribbed portion of the garment downwardly along the spurs 24, whereby said ribbed portion is forced substantially to the lowermost portions of said spurs. The channel member 46 is then raised and returned to its normal position, shown in full line view in Figure 3. The knob 34 of the set screw 33 is then rotated to loosen the set screw, releasing the sleeve 30 and allowing the sleeve 30 to slide on the rod 25 by the contraction of the spring 26. The spurs 24 therefore move closer together, contracting the ribbing of the garment. Steam is then applied to the contracted ribbing and the garment is simultaneously pulled forward slightly, shrinking the ribbing and causing the ribbing to be pulled to its original shape. After a short period of steaming under these conditions, the garment is disengaged upwardly from the spurs 24 and the operation is completed.

By processing the ribbon as above described, the ribbing is brought back substantially to its original elasticity and shape.

Figure 9:
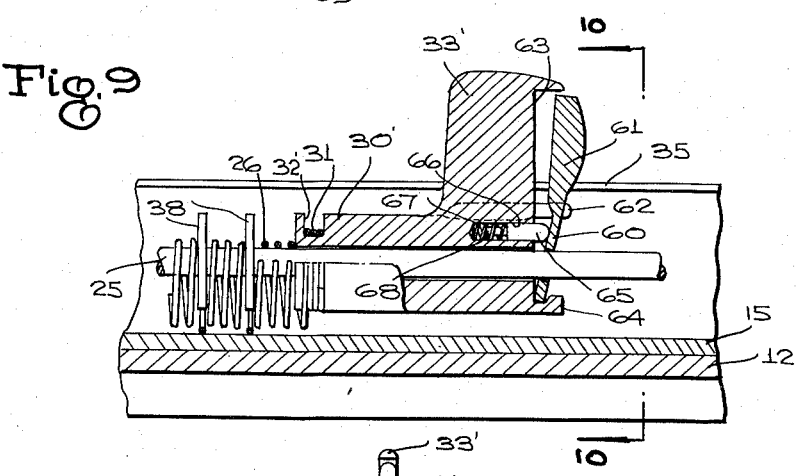
Figure 9 is an enlarged vertical cross-sectional detail view taken on line 9—9 of Figure 8.
Figure 10:
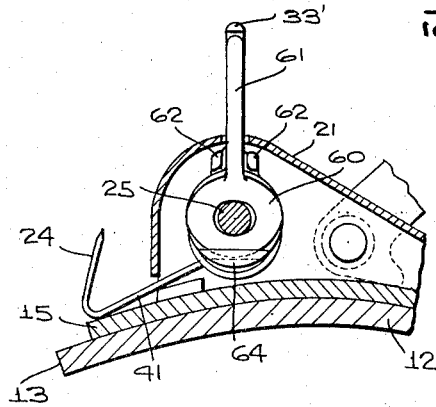
Figure 10 is a cross sectional detail view taken on line 10—10 of Figure 9.

Referring now to the form of the invention shown in Figures 8, 9 and 10, one end of the spring 26 is fixedly secured to one end portion of the rod member 25, as in the previously described form of the invention. Slidably mounted on the rod member 25 is a sleeve member 30' to which the other end of spring 26 is secured, as shown in Figure 9, as by winding several turns 31 of the spring in an annular groove 32' formed in the end portion of the sleeve 30'.

The sleeve 30' is formed with the upstanding lug 33' which extends through the slot 35 and is longitudinally slidable therein. Tiltably engaged on the rod 25 is an eye member 60 formed with an upstanding shank portion 61 which extends between a pair of parallel guide fingers 62, 62 secured to and projecting from the lug 33'. The shank portion 61 is received in a recess 63 provided in the lug 33', as shown. The bottom end of the eye member is pivotally supported in a transverse channel element 64 formed integrally with the lower end portion of sleeve 30'. A plunger element 65 is slidably positioned in a recess 66 formed in sleeve 30' above and parallel to rod 25.

A coiled spring 67 surrounds a reduced rear shank portion 68 formed on the plunger element 65 and biases said plunger element against the upper portion of eye member 60, urging said eye member clockwise, as viewed in Figure 9, causing said eye member to frictionally lock the sleeve 30' on the rod 25. To release the sleeve, the shank portion 61 is manually rotated counterclockwise, as viewed in Figure 9, enabling the sleeve to be moved on the rod 25 by means of the lug 33'.

An inch scale 69 is preferably provided along the plate member 15, as shown in Figures 2 and 8, which provides a means of measuring the dimensions of ribbing material before and after the blocking process.

While a specific embodiment of an improved blocking machine for reforming the ribbed portions of knitted garments has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A device adapted to be mounted on a buck pad for reshaping ribbed portions of garments comprising a downwardly concave base which is arcuate in transverse cross section and which has straight parallel relatively thin, longitudinal edges arranged to indent the buck pad to anchor the device thereon, a horizontal rod-like support mounted on said base, a coil spring extending longitudinally of and surrounding said support, a plurality of forwardly and upwardly extending spurs movably secured between spaced turns of said spring, and means connected to the spring and arranged to clampingly engage said rod-like support for releasably holding said spring in expanded position.

2. A device for reshaping ribbed portions of garments comprising a base, a horizontal rod-like support mounted on said base, a coil spring extending longitudinally of and surrounding said support, a plurality of forwardly and upwardly extending spurs movably secured between spaced turns of said spring, means fixedly connecting one end of said spring to one end portion of said support, sleeve means connected to the other end of the spring and slidable on said support, and means on said sleeve means clampingly engageable with said rod-like support for releasably securing said sleeve means to the support and for holding said spring in expanded position.

3. A device for reshaping ribbed portions of garments comprising a base, a horizontal rod-like support mounted on said base, a coil spring extending longitudinally of and surrounding said support, a plurality of forwardly and upwardly extending spurs movably secured between spaced turns of said spring, means fixedly connecting one end of said spring to one end portion of said support, sleeve means connected to the other end of the spring and slidable on said support, means on said sleeve means clampingly engageable with said rod-like support for releasably securing said sleeve means to the support and for holding said spring in expanded position, and downwardly movable means pivotally connected to said base and being formed and arranged to meshingly engage said spurs.

4. A device adapted to be mounted on a buck pad for reshaping ribbed portions of garments comprising a downwardly concave base which is arcuate in transverse cross section and which has straight parallel, relatively thin, longitudinal edges arranged to indent the buck pad to anchor the device thereon, a horizontal rod-like support mounted on said base, a coil spring extending longitudinally of and surrounding said support, a plurality of forwardly and upwardly extending spurs movably engaged between spaced turns of said spring, means fixedly connecting one end of said spring to one end portion of said support, sleeve means connected to the other end of the spring and slidable on said support, and means on said sleeve means clampingly engageable with said rod-like support for releasably securing said sleeve means to the support for holding said spring in expanded position.

5. A device adapted to be mounted on a buck pad for reshaping ribbed portions of garments comprising a downwardly concave base which is arcuate in transverse cross section and which has straight parallel, relatively thin, longitudinal edges arranged to indent the buck pad to anchor the device thereon, a horizontal rod-like support mounted on said base, a coil spring extending longitudinally of and surrounding said support, a plurality of forwardly and upwardly extending spurs movably engaged between spaced turns of said spring, means fixedly connecting one end of said spring to one end portion of said support, sleeve means connected to the other end of the spring and slidable on said support, means on said sleeve means clampingly engageable with said rod-like support for releasably securing said sleeve means to the support and for holding said spring in expanded position, and downwardly movable means pivotally connected to said base and formed and arranged to meshingly engage said spurs.

6. A device for reshaping ribbed portions of garments comprising a base, a horizontal rod-like support mounted on said base, a coil spring extending longitudinally of and surrounding said support, a plurality of forwardly and upwardly extending spurs movably engaging between spaced turns of said spring, means fixedly connecting one end of said spring to one end portion of said support, sleeve means connected to the other end of the spring and slidable on said support, means on said sleeve means clampingly engageable with said rod-like support for releasably securing said sleeve means to the support for holding said spring in expanded position, a channel member, means pivotally connecting said channel member to said base parallel to said coil spring for movement downwardly over and receiving said spurs, and a second coil spring carried in said channel member and being meshingly engageable with said spurs.

7. A device adapted to be mounted on a buck pad for reshaping ribbon portions of garments comprising a downwardly concave base which is arcuate in transverse section and which has straight parallel, relatively thin, longitudinal edges arranged to indent the buck pad to anchor the device thereon, a horizontal rod-like support mounted on said base, a coil spring extending longitudinally of and surrounding said support, a plurality of forwardly and upwardly extending spurs movably engaged between spaced turns of said spring, means fixedly connecting one end of said spring to one end portion of said support, sleeve means connected to the other end of the spring and slidable on said support, means on said sleeve means clampingly engageable with said rod-like support for releasably securing said last-named means to the support for holding said spring in expanded position, a channel member, means pivotally connecting said channel member to said base parallel to said coil spring for movement downwardly over and receiving said spurs, and a second coil spring carried in said channel member and being meshingly engageable with said spurs.

8. A device for reshaping ribbed portions of garments comprising a base, a horizontal rod-like support mounted on said base, a coil spring extending longitudinally of and surrounding said support, a plurality of forwardly and upwardly extending spurs movably engaged between spaced turns of said spring, means fixedly connecting one end of said spring to one end portion of said support, a sleeve member slidably mounted on said support, means connecting the other end of said spring to said sleeve member, a set screw threadedly engaged through said sleeve member and being clampingly engageable with said rod-like support for holding said spring in expanded position, and downwardly movable means pivotally connected to said base and formed and arranged to meshingly engage said spurs.

References Cited in the file of this patent

UNITED STATES PATENTS 2,531,852    Kohle et al. _____ Nov. 28, 1950